US012649120B2

(12) United States Patent
Schumacher et al.

(10) Patent No.: US 12,649,120 B2
(45) Date of Patent: Jun. 9, 2026

(54) FILTER HAVING FILTER MEDIA SETS WHICH ARE ARRANGED IN A V-SHAPED MANNER AND A FRAME

(71) Applicant: Carl Freudenberg KG, Weinheim (DE)

(72) Inventors: Sascha Schumacher, Wald-Michelbach (DE); Patrick Weber, Weinheim (DE); Thomas Schroth, Bobenheim-Roxheim (DE); Renate Tapper, Bensheim (DE)

(73) Assignee: CARL FREUDENBERG KG, Weinheim (DE)

( * ) Notice: Subject to any disclaimer, the term of this patent is extended or adjusted under 35 U.S.C. 154(b) by 258 days.

(21) Appl. No.: 18/348,371

(22) Filed: Jul. 7, 2023

(65) Prior Publication Data

US 2024/0017197 A1 Jan. 18, 2024

(30) Foreign Application Priority Data

Jul. 14, 2022 (DE) .................... 10 2022 117 650.9

(51) Int. Cl.
| | |
|---|---|
| *B01D 46/00* | (2022.01) |
| *B01D 46/121* | (2022.01) |
| *B01D 46/24* | (2006.01) |
| *B01D 46/52* | (2006.01) |
| *B01D 46/58* | (2022.01) |

(52) U.S. Cl.
CPC ....... *B01D 46/0006* (2013.01); *B01D 46/121* (2022.01); *B01D 46/2411* (2013.01); *B01D 46/521* (2013.01); *B01D 46/58* (2022.01)

(58) Field of Classification Search
CPC ............. B01D 46/121; B01D 46/0006; B01D 46/521; B01D 46/2411; B01D 46/0002; B01D 46/0005
See application file for complete search history.

(56) References Cited

U.S. PATENT DOCUMENTS

| | | | | |
|---|---|---|---|---|
| 6,955,696 | B1 | 10/2005 | Ost et al. | |
| 10,675,580 | B1* | 6/2020 | Wyluda ............. | B01D 46/0005 |
| 2009/0193773 | A1* | 8/2009 | Sundvik ................ | B01D 46/58 |
| | | | | 55/478 |
| 2011/0252759 | A1 | 10/2011 | Nicholas | |
| 2013/0291497 | A1* | 11/2013 | Sundvik ................ | B01D 46/58 |
| | | | | 55/357 |
| 2014/0096493 | A1 | 4/2014 | Kelmartin et al. | |
| 2015/0224434 | A1 | 8/2015 | Hedlund | |
| 2015/0246308 | A1* | 9/2015 | Lans .................. | B01D 46/0005 |
| | | | | 55/497 |
| 2017/0282107 | A1* | 10/2017 | Hugues .............. | B01D 46/0001 |

(Continued)

FOREIGN PATENT DOCUMENTS

| | | |
|---|---|---|
| CN | 102233218 A | 11/2011 |
| CN | 212974515 U | 4/2021 |

(Continued)

*Primary Examiner* — Robert Clemente
(74) *Attorney, Agent, or Firm* — LEYDIG, VOIT & MAYER, LTD.

(57) ABSTRACT

A cartridge filter including a plurality of filter media sets, wherein two of the plurality of filter media sets are arranged in a V-shaped manner, and a frame for receiving the filter media sets. The frame is formed by four elements which are each configured in one piece: an inflow-side upper plate, an outflow-side base plate and two side plates.

12 Claims, 4 Drawing Sheets

(56)           References Cited

U.S. PATENT DOCUMENTS

| 2018/0117515 A1 * | 5/2018 | Hugues | .............. B01D 46/0002 |
| 2022/0241712 A1 * | 8/2022 | Iggander | .............. B01D 46/521 |

FOREIGN PATENT DOCUMENTS

| CN | 216825364 U | 6/2022 | |
| EP | 2895252 B1 | 2/2019 | |
| EP | 3831461 A1 | 6/2021 | |
| WO | WO 2014/111162 A1 | 7/2014 | |
| WO | WO-2024056222 A1 * | 3/2024 | .......... B01D 46/121 |

* cited by examiner

Fig. 6a                    Fig. 6b

FILTER HAVING FILTER MEDIA SETS WHICH ARE ARRANGED IN A V-SHAPED MANNER AND A FRAME

CROSS REFERENCE TO RELATED APPLICATIONS

This application claims benefit to German Patent Application No. DE 10 2022 117 650.9, filed on Jul. 14, 2022, which is hereby incorporated by reference herein.

FIELD

The invention relates to a cartridge filter having a plurality of filter media sets, wherein two filter media sets are arranged in a V-shaped manner in each case, and having a frame for receiving the filter media sets.

BACKGROUND

In gas turbines, compressors, air-conditioning and ventilation installations, extremely different filters are used for cleaning air supply flows, for example, cartridge filters.

EP 3 831 461 A1 discloses such a cartridge filter having a plurality of filter media sets, wherein two filter media sets are arranged in a V-shaped manner and a gas flows through the filter media sets from an unprocessed gas side of the filter to a clean gas side of the filter in order to clean it. Such filters are also referred to as V-cell filters or as V-bank filters. The filter has a frame for receiving the filter media sets with protective grids for the filter medium.

The disadvantage of this filter is the complex assembly of a plurality of individual components.

A filter having such a structure is set out in US 2014 096493 A1.

Such a filter can be inserted in the manner of a drawer into a rectangular compartment of a filter receiving member. With support faces of the upper plate or the upper frame, the filter then abuts the filter receiving member and can be connected thereto, for example, by means of screwing. It is conventional for a filter receiving member to have a plurality of compartments in order to be able to receive a corresponding plurality of filters which are then arranged in the manner of a matrix and form a so-called filter wall. Forces acting on the components of the filter are discharged via the upper plate or the upper frame into the filter receiving member having the compartments and a carrier construction. The disadvantage with these known filters is the complex configuration of the connection of the side plates and the upper plate to projections and protruding flaps. A further disadvantage is a degree of instability or lack of strength of the filter.

SUMMARY

In an embodiment, the present disclosure provides a cartridge filter comprising a plurality of filter media sets, wherein two of the plurality of filter media sets are arranged in a V-shaped manner, and a frame for receiving the filter media sets. The frame is formed by four elements which are each configured in one piece: an inflow-side upper plate, an outflow-side base plate and two side plates.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following:

FIGS. 6a and 6b illustrate a configuration, which is optimised in terms of casting technology, of the cross-member of a filter as detailed cut-outs.

DETAILED DESCRIPTION

Figure 1:
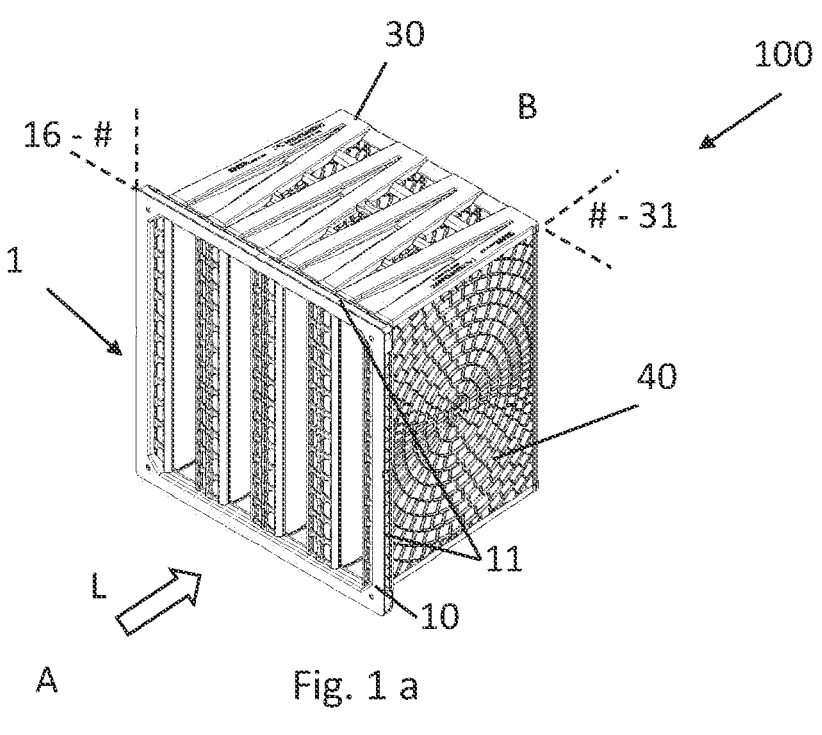
FIGS. 1a and 1b illustrate a filter in two views.
Figure 1:
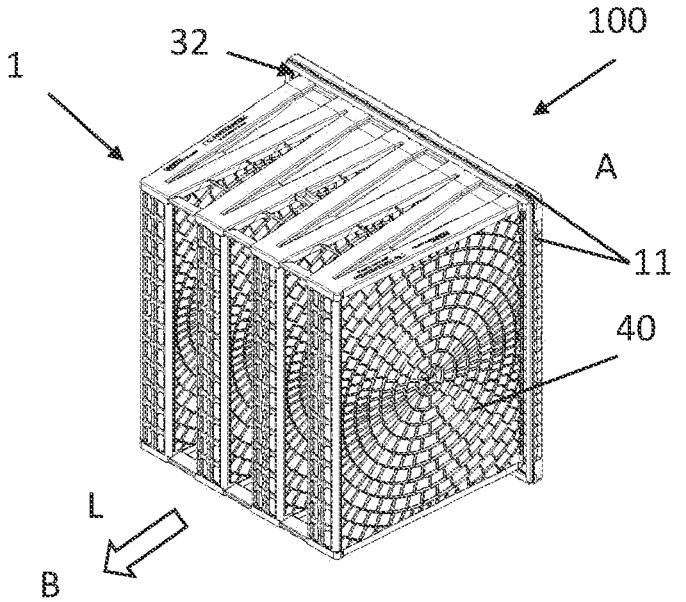

In an embodiment, the present invention provides a cartridge filter, the frame of which has a structure which is simple, stable and advantageous in technical production terms.

An embodiment provides a cartridge filter with a frame, which discharges forces acting on the filter in a particularly effective manner into a filter receiving member, which receives the filter, and which at the same time connects the side plates to the upper plate in a manner which is particularly secure and simple in terms of technical assembly.

An embodiment provides a cartridge filter with a frame which has optimised connection reliability and reduced susceptibility to leakages.

According to an embodiment of the invention, it has been recognised to be advantageous for a cartridge filter to be formed from only a few elements which can be connected to each other in a simple manner during assembly of the filter, which have a good flow of forces through the filter and which ensure a high degree of stability of the filter.

An embodiment of the invention relates to a cartridge filter having a plurality of filter media sets, wherein two filter media sets are always arranged in pairs in a V-shaped manner at an acute angle with respect to each other, and having a frame for receiving the filter media sets. Such a filter is also referred to as a V-cell filter or as a V-bank filter. A gas, in particular air, flows through the filter media sets from an raw gas side of the filter to a clean gas side of the filter in a main throughflow direction (throughflow direction) in order to clean it. According to an embodiment of the invention, the frame is formed by a maximum of four elements, that is to say, only four elements, which are each configured in one piece, that is to say, an inflow-side upper plate, an outflow-side base plate and two side plates. Such a frame advantageously has a structure which is simple and advantageous in technical production terms.

An embodiment of the invention also relates to a cartridge filter having a plurality of filter media sets, wherein two filter media sets are arranged in a V-shaped manner, and having a frame for receiving the filter media sets, in particular having a filter structure as described above.

The frame has an upper frame, a where applicable segmented, outflow-side base plate and two side plates. When the base plate is configured in a segmented manner, it comprises a plurality of cross-members. In this instance, the upper frame according to an embodiment of the invention is formed from an inflow-side single-piece upper plate and part-faces of the side plates. The upper frame has a circumferential rectangular surround and cross-members which are received therein. The circumferential rectangular surround is formed from four external covering faces which are referred to below as outer faces. The cross-members may be in the form of single cross-members and dual cross-members. In dual cross-members, a cross-member is provided for a respective pair of filter media sets which are arranged in a V-shaped manner. In single cross-members, a cross-member is provided for a filter media set in each case. The surround is in this instance formed at least by means of faces of the upper plate which are located in the plane of the upper frame. A high degree of stability of the upper frame is thereby achieved.

In particular, two lateral outer faces of the upper frame can be formed by the part-faces of the side plates. These are opposing outer faces of the upper frame. A respective part-face is located in this instance in the plane of the respective side plate or in a plane parallel therewith if the respective side plate has a shoulder in the region of the part-face and is raised with respect to the plane of the side face. In this manner, material can advantageously be saved on the upper frame and a simple connection of the upper frame and side portions with a reduced risk of leakage and weight of the filter can be produced.

In an advantageous and preferred embodiment of the filter, each side plate has at least two connection elements and the upper plate has in each case at least two associated complementary counter-elements, wherein the connection elements and counter-elements are configured to be able to be pushed one into the other in order to produce a positive-locking connection of connection elements and counter-elements. The at least two connection elements of each side plate are preferably orientated at right-angles with respect to the part-faces of the side plates and the inner side of the filter.

It has been found to be advantageous for connection elements and counter-elements to be orientated in the plane of the upper frame and consequently perpendicularly to the throughflow direction. The main force flow direction in which the forces act in the filter and have to be absorbed by the elements of the filter is also located in the throughflow direction. The force path of forces acting as a result of operation on the filter consequently does not act primarily in the direction in which the connection elements and counter-elements are orientated. The risk of them becoming detached can thereby be reduced. If an additional connection as a result of casting compound is present, the above-mentioned advantages are also afforded that a breaking open and detachment of the casting compound, for example, as a result of the play required as a result of the system between the connection and counter-elements can be prevented. In this development, a compact construction with at the same time good stability of the filter is achieved.

In a possible embodiment of the filter, the connection elements are in the form of journals and the counter-elements in the form of sleeves which receive the journals. In a corresponding embodiment, a clip-fit connection can also be produced.

In an alternative or additional embodiment of the filter, the connection elements are in the form of a bar which forms a lock and the counter-elements in the form of loop-like bar receiving members.

An embodiment of the invention also relates to a cartridge filter having a plurality of filter media sets, wherein two filter media sets are arranged in a V-shaped manner in each case, and having a frame for receiving the filter media sets, in particular having a filter structure as set out above. The frame is formed by an inflow-side upper plate, two side plates and a single-piece, outflow-side base plate. Such a frame advantageously has a structure which is simple and advantageous in terms of technical production.

In an advantageous and preferred embodiment of the filter, the single-piece base plate has cross-members, wherein a cross-member is provided in each case for a respective pair of filter media sets which are arranged in a V-shaped manner and can therefore be referred to as a dual cross-member. One cross-member is connected to the respective next cross-member by means of webs or by means of at least one continuous web. The webs or the continuous web may, for example, be arranged with spacing from the ends and centrally with respect to the cross-members. In one embodiment which is preferred as a result of its higher level of stability, a cross-member is connected at the two ends thereof to the respective next cross-member by means of webs or by means of a continuous web in each case so that the base plate has a ladder-like basic shape.

It is further advantageous for recesses to be provided in the side plates for the positive-locking receiving of end portions of the cross-members, for example, pocket-like recesses for receiving flap-like end portions which enable a plug-type connection. With a corresponding fit selection, the plug-type connection can be produced as a clamping connection. In particular, the recesses are orientated in such a perpendicular manner with respect to the throughflow direction that cross-members and side plates are inserted into each other perpendicularly with respect to the throughflow direction. A particularly high level of connection security of the base plate and the side plates can thereby be achieved. In addition, locking elements may be provided for locking the base plate and side plates.

An embodiment of the invention also relates to a cartridge filter having a plurality of filter media sets, wherein two filter media sets are arranged in each case in a V-shaped manner, and having a frame for receiving the filter media sets, in particular having a structure as described above. The frame is formed by means of an inflow-side upper plate, two side plates and an outflow-side base plate and the upper plate and the base plate have plate-like cross-members which extend from one side plate to the other. The upper plate and base plate may be configured in one piece or in a segmented manner. According to an embodiment of the invention, the filter media sets at the end faces thereof, which are also referred to as recumbent folds, are connected to the cross-members in a cohesively bonded manner by means of casting with a casting compound. In order to achieve a secure casting which at the same time saves material, inner faces of the cross members which are directed towards the inner side of the filter each have a topography which is optimised in terms of casting with raised and/or recessed regions.

The filters described above may additionally have protective grids which are arranged on a respective filter media set at the clean gas side and are connected to the frame, and ensure a burst protection function. The connection can be carried out by means of casting.

The casting-optimised topographies of the inner faces of the cross-members may in particular have the following features:

shell-like or cylindrical-disc-like projections in order to reduce the required quantity and more rapid distribution of the casting material and/or casting channels which lead into the edge region of the cross-members for casting protective grids which cover the filter media sets so that the protective grids can be connected to the cross-members in a purely cohesively bonded manner and no additional positive-locking or non-positive-locking connection elements are required and/or flow channels for rapid and planar distribution of casting material over the inner face of the cross-members and/or positioning elements which are formed from sword-like individual ribs as auxiliary positioning members for the filter media sets, which do not impede the distribution of the casting compound.

Embodiments of the invention described and the described advantageous developments may also be combined with each other as technically advantageous embodiments of the invention.

An embodiment of the invention is intended to be explained in greater detail with reference to appended exemplary Figures. Elements and components which correspond to each other are given the same reference numerals in the Figures. For the sake of greater clarity of the Figures, an illustration which is true to scale has been omitted.

FIGS. 1a and 1b show a cartridge filter 100 according to an embodiment of the invention in two perspective views.

The cartridge filter 100 has eight filter media sets 2 which can be formed from pleated filter medium. Each group of two filter media sets 2 is always arranged in pairs in a V-shaped manner at an acute angle with respect to each other. A gas flows through the filter media sets 2 from an unprocessed gas side A of the filter 100 to a clean gas side B of the filter 100 in the throughflow direction L in order to clean it.

FIG. 1a shows the filter 100 from the unprocessed gas side A and FIG. 1b shows it from the clean gas side B.

In order to receive the filter media sets 2, a frame 1 is provided. The structure of the frame 1 can be seen more clearly in FIG. 2. FIG. 1a indicates the plane 16 in which the upper frame is located and the plane 31 in which the side plate 30 (located at the top in the image) is located. From FIG. 1b, it can be seen that the side plates 30 have a shoulder 32 in the region in which they are connected to the upper plate 10.

A protective grid 40 is arranged in each case at the clean gas side (A) on a respective filter medium set 2. As a result of the protective grid 40, the filter medium of the filter media sets 2 is fixed in its position, in a state protected from impairment and subsequent installations are protected from damage. In the embodiment illustrated, a respective protective grid 40 is constructed in one piece as an injection-moulded component and connected at the circumferential edge thereof in the region of an edge strut to the frame 1 in a cohesively bonded manner, for example, cast.

The four outer faces which are part of the upper frame 11 and which are in the form of a circumferential rectangular surround are indicated by the lines of the reference numeral 11.

Figure 2:
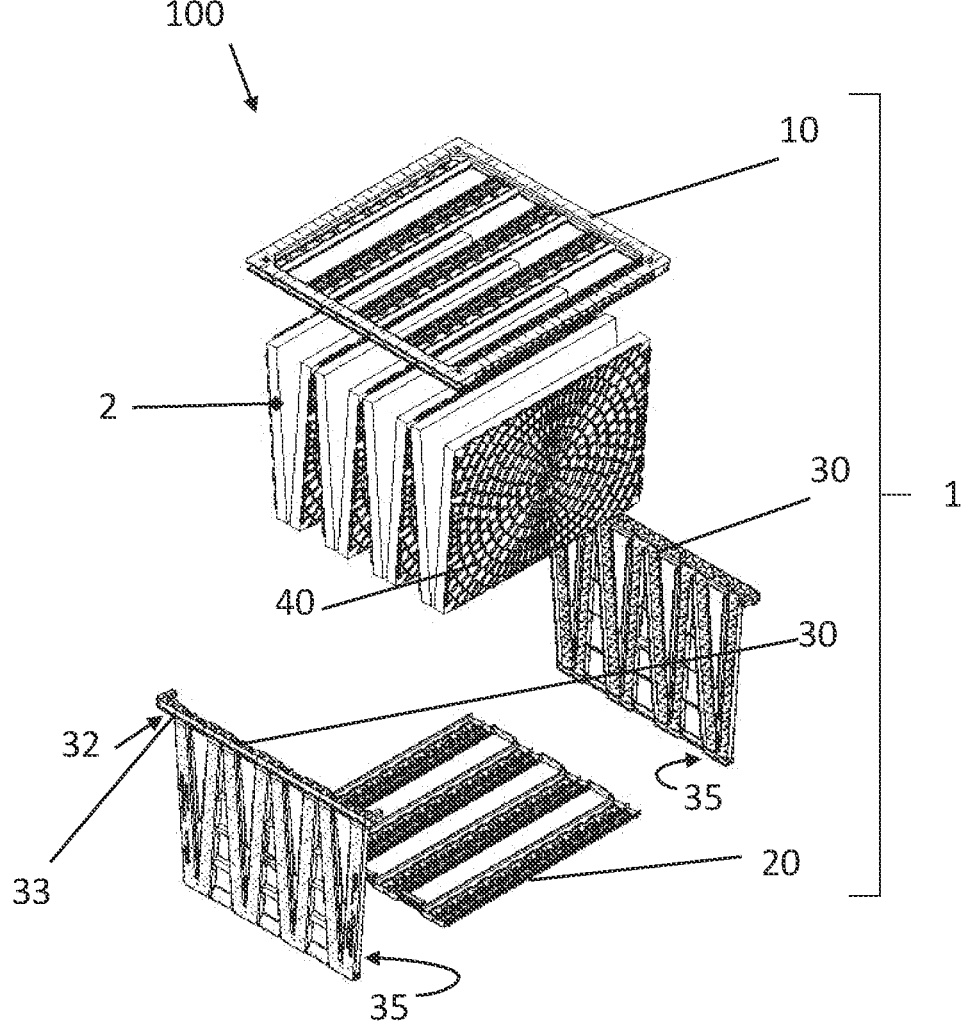
FIG. 2 illustrates an exploded view of a filter.

FIG. 2 shows an exploded illustration of a cartridge filter 100 in a possible embodiment according to the invention and the structure of the frame 1. The frame 1 has an upper plate 10 with a plurality of cross-members 12, 13 and a base plate 20 which is arranged parallel therewith and which has a plurality of cross-members 23 and side plates 30 which are arranged therebetween and perpendicularly thereto. There are provided in the side plates 30 recesses 35 in which elements which are located on the base plate 20 can engage in order to produce a positive-locking connection. In the side plates 30, there are also provided connection elements 34 which can be connected in a positive-locking manner to counter-elements which are located on the upper plate 10

Figures 4A, 4B:
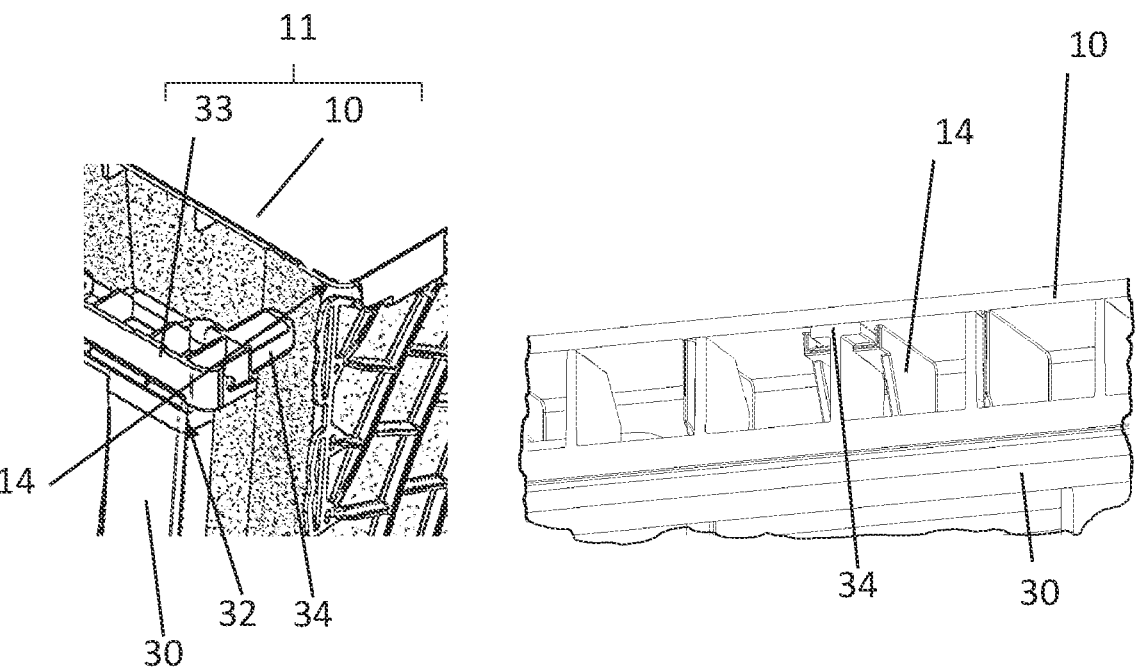
FIGS. 4a and 4b illustrate the connection of the side plate to the upper plate as a detailed cut-out and a detailed section.

(cf. FIGS. 4a and 4b). The filter media sets 2 are arranged between the upper plate 10, base plate 20 and side plates 30 and received in the frame 1. In the embodiment illustrated, the upper plate 10 and the base plate 20 and the side plates 30 are constructed in one piece. In alternative embodiments, the plates 10, 20, 30 may also be configured to be partially segmented and in several pieces.

The filter 100 may be inserted in the manner of a drawer into a rectangular compartment of a filter receiving member. With support faces of the upper plate 10 or the upper frame 11, the filter 100 then abuts the filter receiving member and can be connected thereto, for example, by means of screwing. It is also possible for a filter receiving member to have a plurality of compartments in order to be able to receive a corresponding plurality of filters 100 which are then arranged in the manner of a matrix and form a so-called filter wall.

Figure 3:
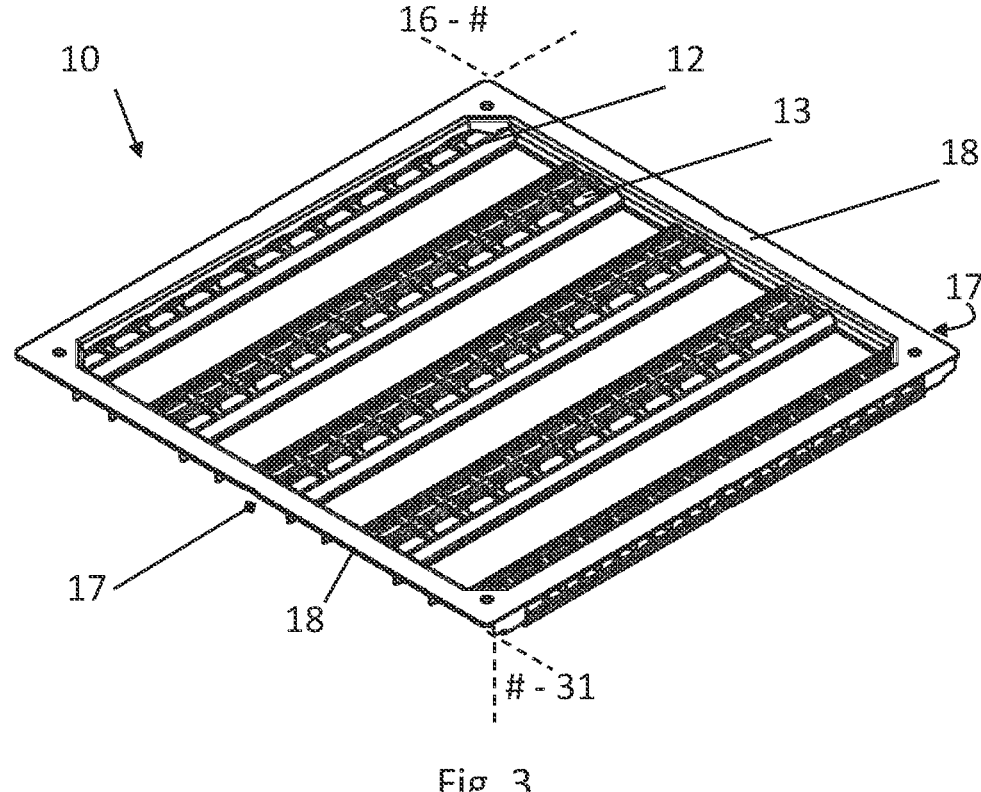
FIG. 3 illustrates a single-piece upper plate of a filter.

FIG. 3 shows a single-piece upper plate 10 of a filter 100 as used in the filters 100 according to FIGS. 1a, 1b and 2. This has cross-members which are arranged in the manner of a ladder, that is to say, two external individual cross-members 12 and internal dual cross-members 13. The cross-members 12, 13 are connected to each other by means of continuous bars 18. The individual cross-members 12 and the bars 18 form a circumferential rectangular surround in which the dual cross-members 13 are received. The surround is in this instance formed at least by means of faces of the upper plate 10 which are located in the plane 16 of the upper frame 11. A high degree of stability of the upper frame 11 is thereby achieved. The upper plate 11 has no externally continuous circumferential face but instead two side faces which are marked with the position 17 are missing, it does not therefore have the configuration of a frame.

The upper frame 11 of the filter 100 which serves to receive in a filter receiving member is composed of this upper plate 10 and of part-faces 33 of the side plates 30 which after complete assembly of the filter 100 form the missing side faces 17, as illustrated in greater detail in FIG. 4a.

The lateral outer faces of the upper frame 11 in the plane 31 of the side plates 30 or parallel therewith are thus formed by the part-faces 33 of the side plates 30.

FIGS. 4a and 4b show the connection of the side plates 30 to the upper plate 10 as detailed cut-outs. Both illustrations show the process of the assembly and not the completely mounted filter 100.

As already explained with reference to FIG. 3 and illustrated in FIG. 4a, the lateral outer faces of the upper frame 11 are formed by the part-faces 33 of the side plates 30. The part-faces 33 are raised with respect to the plane 31 of the respective side plate 30. A shoulder 32 and consequently a support face of the filter 100 for contact with a counter-face of a filter receiving member is thereby provided.

Each side plate 30 has at least two connection elements 34 and the upper plate 10 has complementary counter-elements 14 which are configured to be able to be inserted one in the other and which enable a positive-locking connection of a respective side plate 30 to the upper plate 10.

The connection elements 34 and counter-elements 14 are orientated in the plane of the upper frame 11 so that the assembly direction is located at right-angles with respect to the throughflow direction L.

The connection elements 34 may as shown in FIG. 4a be in the form of journals and the counter-elements 14 in the form of sleeves which receive the journals.

The connection elements 34 and counter-elements 14 may also be in the form of a bar which forms a lock and loop-like bar receiving members, as illustrated in FIG. 4*b*. Both variants can also be combined with each other in order to ensure an even more secure connection of a respective side plate 30 to the upper plate 10.

Figure 5:
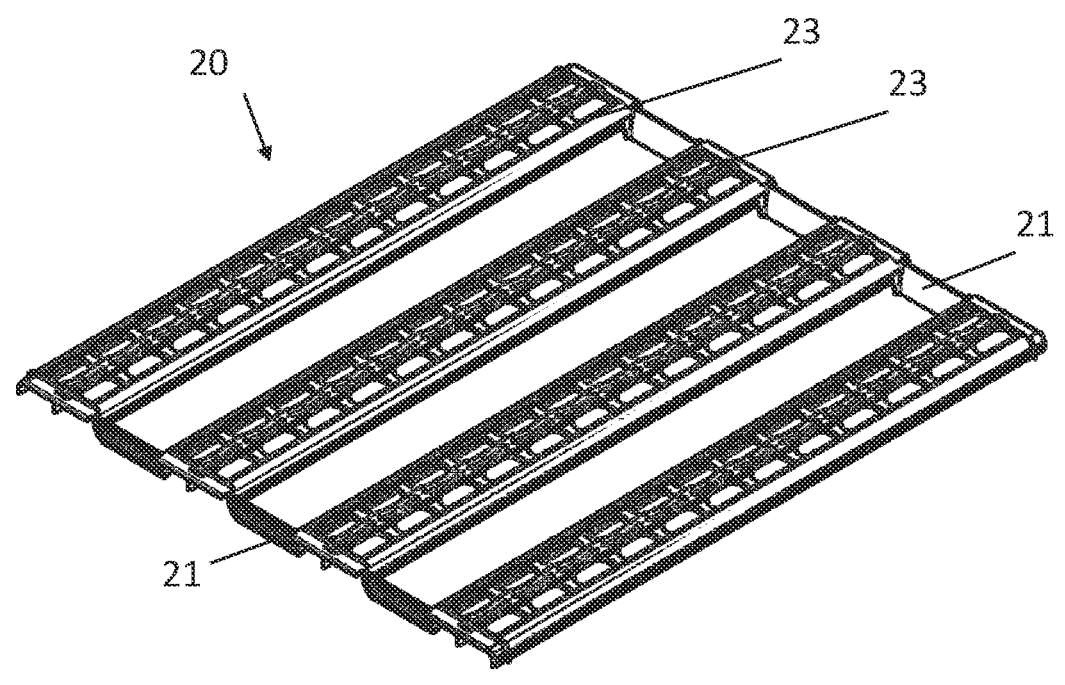
FIG. 5 illustrates a single-piece base plate of a filter.

FIG. 5 shows a single-piece base plate 20 of a filter 10, as used in the filters 100 according to FIGS. 1*a*, *b*, and 2. The single-piece base plate 20 has cross-members 23, wherein a dual cross-member 23 is provided in each case for the connection to a respective pair of filter media sets 2 which are arranged in a V-shaped manner, and a cross-member 23 is connected to the respective next cross-member 23 at the ends thereof by means of webs 21.

As indicated in FIG. 2, recesses 35 are provided in the side plates 30 for the positive-locking receiving of end portions of the cross-members 23 of the base plate 20 and thus enable a positive-locking connection of side plates 30 and base plate 20.

FIGS. 6*a* and 6*b* show the configuration, which is optimised in technical casting terms, of the cross-members 13, 23 of the upper plate 20 and base plate 20 of a filter 100 as detailed cut-outs using the example of a dual cross-member. Individual cross-members 12 of the upper plate 10 can accordingly also have a configuration which is optimised in technical casting terms. FIG. 6*a* shows a section through a pair of filter media sets 2 and the associated dual cross-member 13, 23. FIG. 6*b* shows a view of the same dual cross-member 13, 23 from inside the filter 100, for greater clarity with all additional elements of the filter 100 being omitted.

Filter media sets 2 are connected in a cohesively bonded manner at the end faces 3 thereof to the cross-members 12, 13, 23 by means of casting compound 55 and are thus fixed in the frame 1 of the filter 100. As illustrated in FIGS. 6*a* and 6*b*, the inner faces 50, which are directed towards the inner side of the filter 100, of the cross-members 12, 13, 23 each have a casting-optimised topography with the following features:

shell-like or cylindrical-disc-like projections 51,
    casting channels 52 which lead into the edge region of the cross-members in order to cast protective grids 40 which cover the filter media sets 2,
    flow channels 53 for rapid and planar distribution of casting material over the inner face of the cross-members 12, 13, 23,
    positioning elements which are formed from a plurality of grouped individual ribs 54 as auxiliary positioning members for the filter media sets 2, wherein casting compound can flow through between the individual ribs 54.

In alternative embodiments, the inner faces 50 may also have only individual features of the above-mentioned features. In individual cross-members 12 of the upper plate 10, sword-like individual ribs 54 are generally dispensed with.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cartridge filter comprising:
a plurality of filter media sets, wherein two of the plurality of filter media sets are arranged in a V-shaped manner; and
a frame for receiving the filter media sets,
wherein the frame is formed by only four elements which are each configured in one piece: an inflow-side upper plate, an outflow-side base plate and two side plates.

2. The cartridge filter according to claim 1, wherein the filter additionally has protective grids which are arranged on a respective filter media set.

3. A cartridge filter, comprising:
a plurality of filter media sets, wherein two of the plurality of filter media sets are arranged in a V-shaped manner; and
a frame for receiving the filter media sets,
wherein the frame has an upper frame, an outflow-side base plate and two side plates,
wherein the upper frame is formed from an inflow-side single-piece upper plate and part-faces of the side plates,
wherein each side plate has at least two connection elements and the upper plate has in each case at least two complementary counter-elements, and
wherein the connection elements and counter-elements are configured to be able to be pushed one into the other.

4. The cartridge filter according to claim 3, wherein lateral outer faces of the upper frame are formed by the part-faces of the side plates.

5. The cartridge filter according to claim 3, wherein connection elements and counter-elements are orientated in the plane of the upper frame.

6. The cartridge filter according to claim 3, wherein the connection elements are in the form of journals and the counter-elements are in the form of sleeves which receive the journals.

7. The cartridge filter according to claim 3, wherein the connection elements and counter-elements are in the form of a bar which forms a lock and loop-like bar receiving members, respectively.

8. The cartridge filter according to claim 3, wherein the filter additionally has protective grids which are arranged on a respective filter media set.

9. A cartridge filter, comprising:
a plurality of filter media sets, wherein two of the plurality of filter media sets are arranged in a V-shaped manner; and
a frame for receiving the filter media sets,

wherein the frame is formed by an inflow-side upper plate, two side plates and a single-piece, outflow-side base plate, wherein the single-piece base plate has cross-members, wherein a cross-member is provided in each case for a respective pair of filter media sets which are arranged in a V-shaped manner and a cross-member is connected to the respective next cross-member by at least one web, and wherein recesses are provided in the side plates for positive-locking receiving of end portions of the cross-members of the base plate.

10. The cartridge filter according to claim 9, wherein the filter additionally has protective grids which are arranged on a respective filter media set.

11. A cartridge filter, comprising:

a plurality of filter media sets, wherein two of the plurality of filter media sets are arranged in a V-shaped manner; and a frame for receiving the filter media sets, wherein the frame is formed by an inflow-side upper plate, two side plates and an outflow-side base plate and the upper plate and the base plate have plate-like cross-members,

wherein the filter media sets are connected to the cross-members in a cohesively bonded manner by casting, wherein the inner faces, which are directed towards the inner side of the filter, of the cross members each have a topography which is optimised in terms of casting, wherein the topographies have the following features:

shell-like or cylindrical-disc-like projections, and/or casting channels which lead into the edge region of the cross-members for casting protective grids which cover the filter media sets, and/or flow channels for rapid and planar distribution of casting material over the inner face of the cross-members, and/or positioning elements which are formed from individual ribs as auxiliary positioning members for the filter media sets.

12. The cartridge filter according to claim 11, wherein the filter additionally has protective grids which are arranged on a respective filter media set.

* * * * *